No. 670,799. Patented Mar. 26, 1901.
F. X. MILLER.
MONKEY WRENCH.
(Application filed Sept. 22, 1900.)

(No Model.)

Witnesses:
Chas. E. Taylor,
Geo. C. Davis

Inventor:
F. X. Miller.
By L. B. Coupland & Co.
Att'ys

THE NORRIS PETERS CO., PHOTO-LITHO., WASHINGTON, D. C.

UNITED STATES PATENT OFFICE.

FRANK X. MILLER, OF CHICAGO, ILLINOIS.

MONKEY-WRENCH.

SPECIFICATION forming part of Letters Patent No. 670,799, dated March 26, 1901.

Application filed September 22, 1900. Serial No. 30,791. (No model.)

*To all whom it may concern:*

Be it known that I, FRANK X. MILLER, a citizen of the United States, residing at Chicago, in the county of Cook and State of Illinois, have invented certain new and useful Improvements in Monkey-Wrenches; and I do hereby declare the following to be a full, clear, and exact description of the invention, such as will enable others skilled in the art to which it appertains to make and use the same.

This invention relates to improvements in monkey-wrenches of the movable or sliding jaw type, and has for its object to provide a useful and convenient device of this character, as will be hereinafter set forth.

Figure 1:
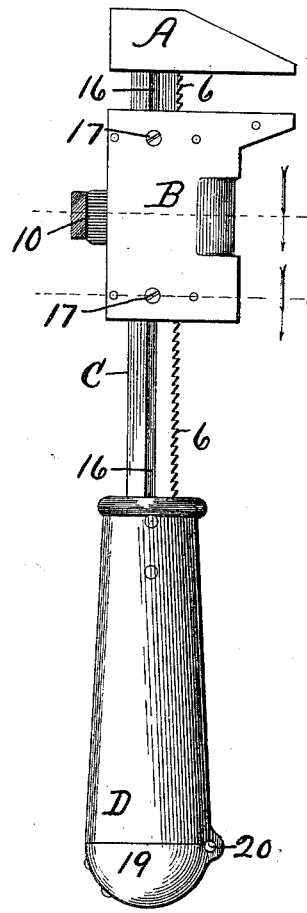
Figure 2:
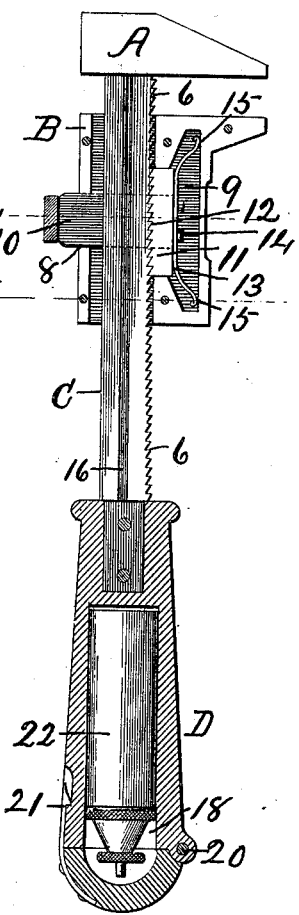
Figure 3:
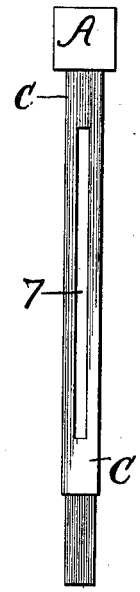
Figure 4:
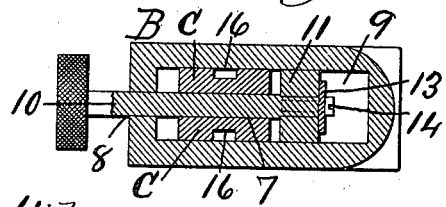
Figure 5:
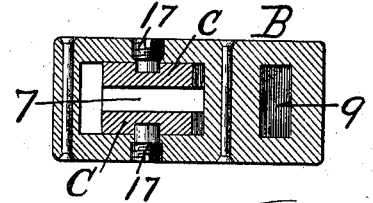

In the accompanying drawings, Figure 1 is an elevation of the device proper. Fig. 2 is a longitudinal section and part elevation of the same. Fig. 3 is a detached rear elevation of the wrench-bar and stationary jaw. Fig. 4 is a transverse section on line 4, Fig. 1, looking in the direction indicated by the arrow; and Fig. 5 is a transverse section on line 5, Fig. 1.

A represents the stationary jaw; B, the movable jaw; C, a bar on which the movable jaw slides, and D the handle.

The bar C is provided along its inner edge with a series of teeth 6, forming a ratchet-bar. The stationary jaw A is rigidly mounted on the upper end of this and the handle D secured to the end, as shown in Figs. 1 and 2. The ratchet-bar is provided longitudinally with a slot 7, Fig. 3, opening through from the outer edge. The movable jaw is provided with an aperture 8, opening from the outer edge into a chamber 9 in the inner part of the movable jaw, as shown in Fig. 2. The aperture 8 is in line with slot 7 and provides for the insertion of a push-pin 10, which extends in through slot 7 and has a ratchet-dog 11 mounted on the inner terminal end thereof. This dog is of some length, so as to have a considerable bearing area, and is provided with a series of teeth 12, adapted to movably engage the correspondingly-toothed edge of the ratchet-bar.

The body portion of a bow-spring 13 is secured to the ratchet-dog, as shown at 14, the respective ends of the spring having a wide-apart bearing on the adjacent wall of the chamber 9 in the movable jaw, as at 15, Fig. 2. This spring acts to automatically hold the dog to a uniform bearing in its engaged locking position.

The ratchet-bar is provided on opposite sides with longitudinal grooves 16, Figs. 1, 2, 4, and 5, for the reception of the inner ends of the guide-pins 17. The purpose of these pins is to retain the movable jaw in alinement as it is shifted back and forth and prevent the adjacent surface of the jaw from contacting the toothed edge of the ratchet-bar.

The handle D is provided with a chamber 18, to which access is afforded by a closing-cap 19, having a hinged connection 20 and a locking-catch 21 for retaining the cap in its closed position. This chamber may be used as a receptacle for an oil-can 22 or any other object it may be necessary to have in conjunction with a wrench.

By pressing on the protruding end of the push-pin the locking-dog is thrown out of engagement, when the sliding jaw may be moved in either direction to the desired position. When the pressure is relaxed, the bow-spring throws the dog into engagement with the ratchet-bar and locks the jaw against movement.

Having thus described my invention, what I claim as new, and desire to secure by Letters Patent, is—

1. In a wrench of the class described, the combination with a bar, provided with ratchet-teeth and having a stationary jaw on one end and a handle on the other, a movable jaw, having a chamber formed therein, a dog, located in said chamber and engaging the toothed side of said bar, a push-pin, inserted therethrough and having said dog rigidly mounted on the inner end thereof, and a spring, adapted to hold the dog in its engaged position, substantially as described.

2. In a wrench of the class described, the combination with a handle-bar, mounting a stationary jaw and provided longitudinally with a slot and having ratchet-teeth along the inner edge thereof, of a sliding jaw, having a chamber formed therein and loosely mounted in position and adapted to be moved by hand, a dog, located in said chamber and engaging the toothed edge of the bar, a push-pin, inserted through said slot and having the dog mounted on its inner end, and a spring, for returning said dog to its engaged position when the pressure on the push-pin is relaxed, substantially as described.

3. In a wrench of the class described, the combination with a bar, having a handle on one end and a rigid jaw on the other and provided with ratchet-teeth along the inner edge, a movable jaw, loosely mounted on the bar, the longitudinal slot extending through the bar from edge to edge, a dog, chambered in the movable jaw and engaging said ratchet-teeth, a push-pin, inserted through said slot, and providing means for disengaging said dog from its locking position, a spring, for returning the dog when the pressure on the push-pin is relaxed, and means for preventing the movable jaw from having contact with the toothed edge of said bar, substantially as described.

In testimony whereof I affix my signature in presence of two witnesses.

FRANK X. MILLER.

Witnesses:
L. M. FREEMAN,
L. B. COUPLAND.